July 28, 1959     E. P. MOSLO     2,896,258
APPARATUS FOR INJECTION MOLDING OF PLASTIC ARTICLES
Filed Feb. 23, 1956     4 Sheets-Sheet 1
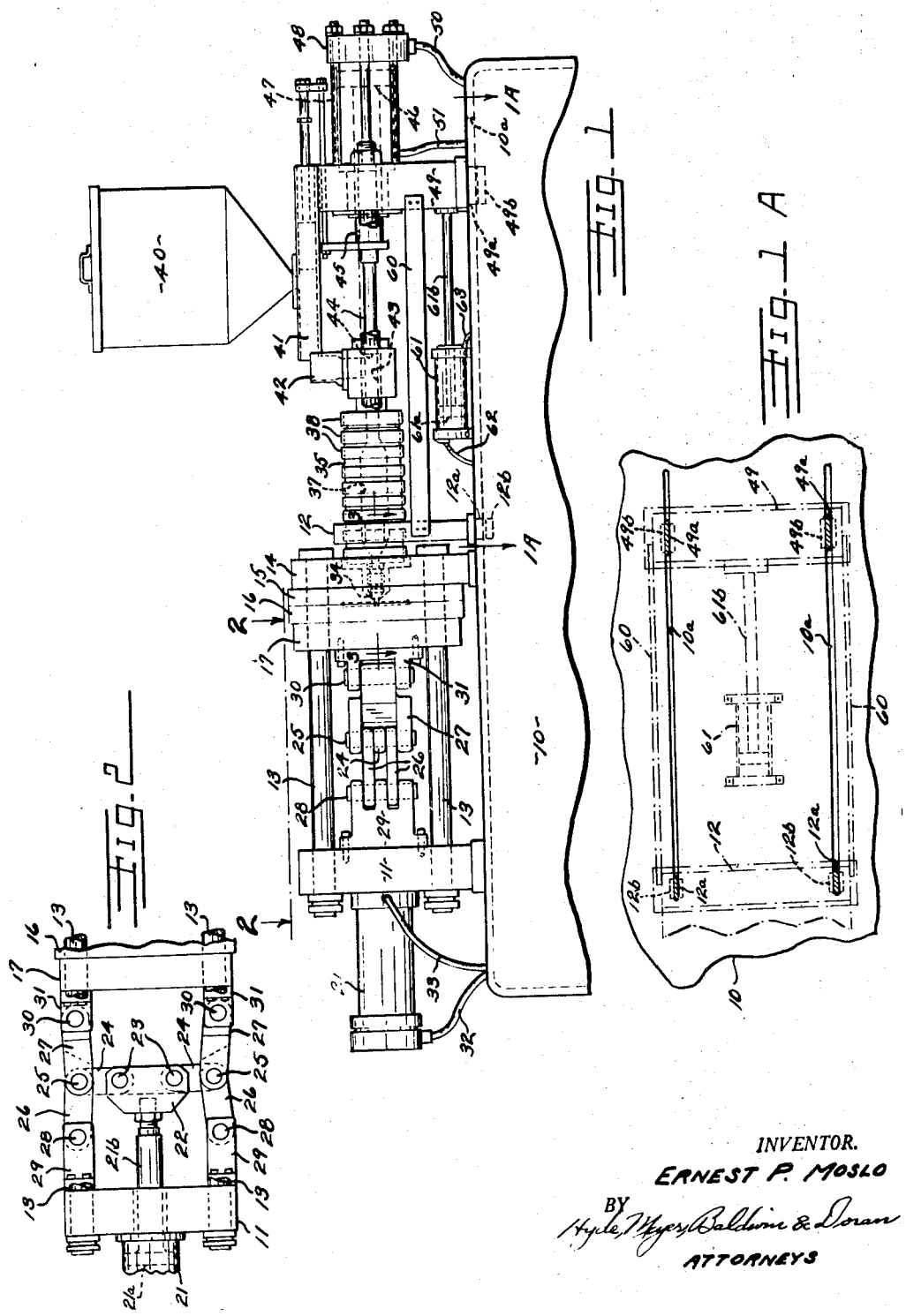
INVENTOR.
ERNEST P. MOSLO
BY
ATTORNEYS July 28, 1959 E. P. MOSLO 2,896,258
APPARATUS FOR INJECTION MOLDING OF PLASTIC ARTICLES
Filed Feb. 23, 1956 4 Sheets-Sheet 2

INVENTOR.
ERNEST P. MOSLO
BY
ATTORNEYS

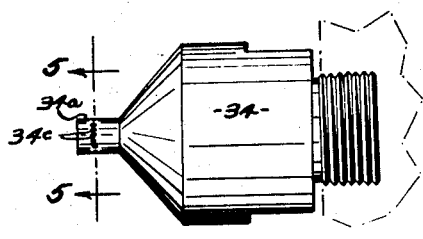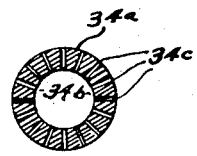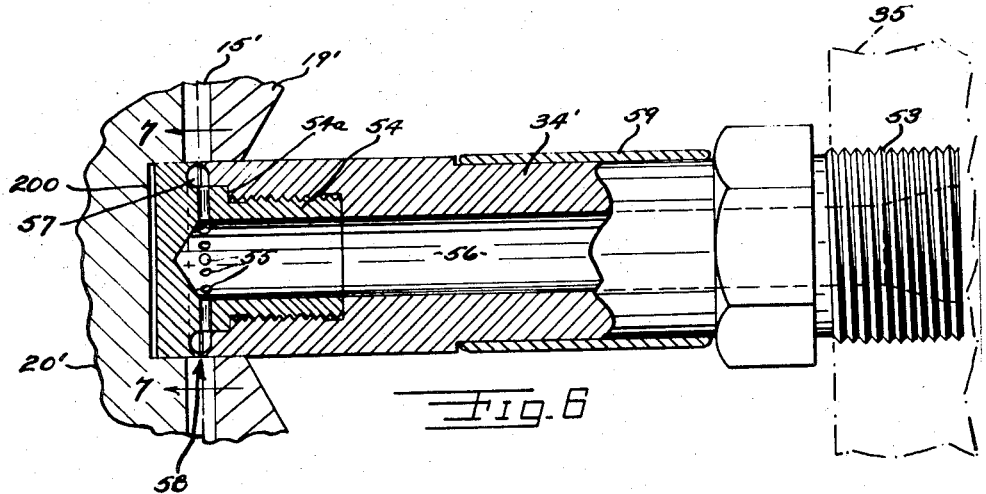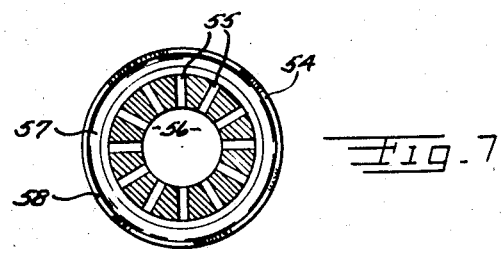

July 28, 1959 E. P. MOSLO 2,896,258
APPARATUS FOR INJECTION MOLDING OF PLASTIC ARTICLES
Filed Feb. 23, 1956 4 Sheets-Sheet 4

INVENTOR.
ERNEST P. MOSLO
BY
Hyde, Myers, Baldwin & Doran
ATTORNEYS 2,896,258
          Patented July 28, 1959

2,896,258

APPARATUS FOR INJECTION MOLDING OF PLASTIC ARTICLES

Ernest P. Moslo, Cleveland, Ohio

Application February 23, 1956, Serial No. 567,364

3 Claims. (Cl. 18—30)

This invention relates to improvements in apparatus and method for the injection molding of plastic articles such as phonograph records, flower pots, bowls, open-work grilles and the like.

This application is a continuation-in-part of my co-pending application Serial No. 476,769, filed December 21, 1954, for Method and Apparatus for Injection Molding of Thin Flat Disks.

One of the objects of the present invention is to provide a method for the injection molding of such articles of synthetic resin material or the like, wherein the finished article is to have a central through opening, my new method comprising injecting the flowable resin material into a die having a cavity of the shape of the article to be molded, from a nozzle filling the location of the central through opening of the finished article, and then removing the nozzle from such opening after the injected resin material has set, so as to provide the finished article without any attached sprue.

Another object of the present invention is to provide apparatus for the injection molding of relatively thin disks having a central opening, including the provision of a die having walls completely enclosing a cavity having the form of the disk to be molded, save for a central opening, together with an injection nozzle completely filling this opening and having passage means communicating with the cavity, combined with means for injecting flowable synthetic resin material through the nozzle and passage means into the cavity, and means for providing for separation between the nozzle and the die after the disk is molded to clear the nozzle from the openings, thus causing the nozzle, as it is withdrawn from the openings, to shear the resin material around the periphery of the nozzle leaving no sprue.

A further object of the invention is the provision of a novel nozzle communicating with the cavity in the die for the molding of an article wherein the periphery of the nozzle coincides with the size of the hole to be formed in the article and the exit opening of the flowable synthetic material into the cavity of the die is a very small cross-section in any dimension so that any small amount of synthetic material which solidifies in the nozzle openings is acceptably incorporated in the next article to be molded and no material is wasted in sprues or has to be remelted or thrown away.

A modification of the invention shows another object, namely, the injection molding of an article of synthetic resin material having a central opening, but an opening which does not go completely through the article after it is molded. Such an article will be molded in a die having walls which completely enclose the lateral walls of a cavity providing a central opening which will eventuate in a closed recess in an article after it is molded. Then an injection nozzle completely fills this opening insofar as the lateral or peripheral walls are concerned, there being resin flow passages extending radially of the nozzle in the zone of the opening and communicating with the cavity, whereby, after the device is molded, the nozzle as it is withdrawn from the opening shears the resin material around the periphery of the nozzle leaving no sprue.

Other objects and advantages of my invention will be apparent from the accompanying drawings and descriptions and the essential features thereof will be set forth in the appended claims.

In the drawings,

Fig. 1 is a side elevational view of an injection molding machine adapted for carrying out my invention;

Fig. 1A is a fragmental sectional view taken along the line 1A—1A of Fig. 1;

Fig. 2 is a fragmental plan view taken from the plane of the line 2—2 of Fig. 1 illustrating the toggle linkage which clamps the die in position in the machine of Fig. 1;

Fig. 4 is an enlarged elevational view of the nozzle of Fig 3;

Fig. 5 is a transverse sectional view enlarged taken along the line 5—5 of Fig. 4;

Fig. 6 is a central sectional view through a modified form of nozzle for phonograph disks having a larger central through opening than the first described form;

Fig. 7 is a transverse sectional view taken along the line 7—7 of Fig. 6;

Fig. 9 is a fragmental sectional view showing a portion of Fig. 3 modified so as to mold an open-work grille member; while

Figure 3:
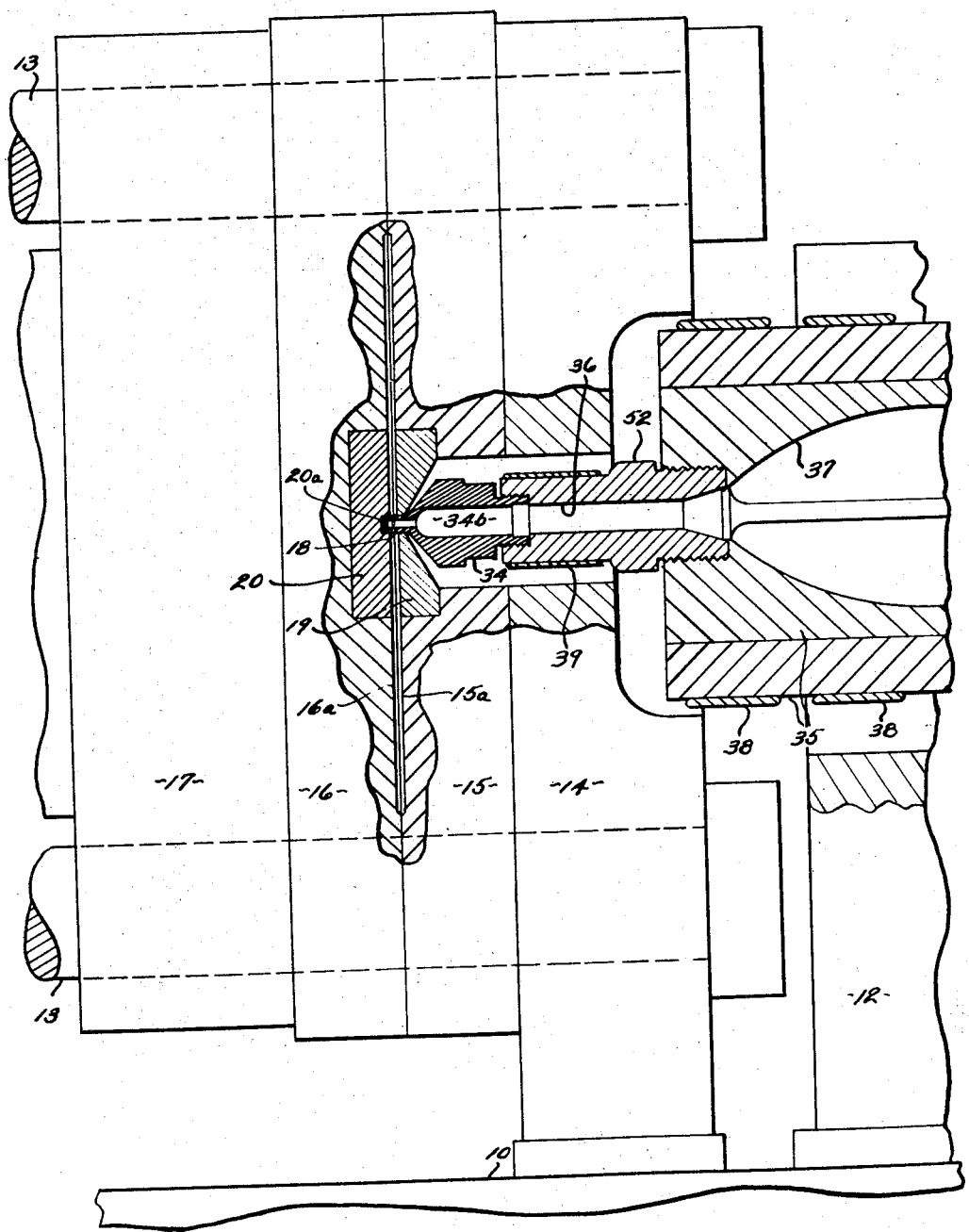
Fig. 3 is a view taken along the line 3—3 of Fig. 1, enlarged, and broken away in central section to more clearly show the injection chamber, nozzle and die cavity.

While my invention may be carried out utilizing any suitable injection molding machine, I have shown in Figs. 1 and 2 a machine for carrying out my invention. This comprises a base 10 to which are fixed end frame members 11 and 14 which are fixed together in a rigid frame by four parallel rods 13. Mounted on the frame and in order from the plate 14 toward the left as viewed in Fig. 1, there is a front cavity plate 15, a rear cavity plate 16 and a support plate 17. As more clearly shown in Fig. 3, the cavity plate 15 has a recess 15a while the cavity plate 16 has a registering recess 16a. In the usual manner, the recesses 15a and 16a when brought together as shown in Fig. 3 provide a cavity having the form of a photograph disk to be molded. This cavity is completely closed around its periphery but is provided with a through opening 18 at the center where the hole in the phonograph record will be when the disk is completed. Hardened wear pieces 19 and 20 are set into the plates 15 and 16 respectively so as to guard against wear at the place where the injection nozzle enters and leaves the die plates.

Means are provided for moving the plates 16 and 17 away from the plate 15 in the usual manner to open and close the die cavity so that a molded disk may be removed. This die clamping mechanism comprises a cylinder and piston motor 21 secured to the frame member 11 and having a piston 21a connected with a piston rod 21b which in turn carries a clevis 22 at its right-hand end as shown in Fig. 2. This clevis is omitted from Fig. 1 for clearness. The clevis has pivotal connections at 23 with links 24, of which there are two. Each link 24 at its outer end is pivotally connected at 25 with upwardly extending pair of links 26 and a downwardly extending U-shaped link 27. The links 26 are pivotally connected at 28 with a fixed abutment 29 which is secured to the frame member 11. The downwardly extending links 27 are pivotally connected at 30 with a bracket 31 which is rigidly secured to the plate 17. Motive fluid is supplied to opposite ends of the cylinder 21 under suitable controls (not shown) so that hydraulic fluid may be supplied through line 32 to the outer end of the cylinder to drive the piston 21a toward the right as viewed in Figs. 1 and 2 to exert a clamping action clamping the die cavity plates 15 and 16 tightly together. At such time, the links 26 and 27 are forced into a nearly straight line relationship, as in Fig. 2, by means of the links 24 pushing outwardly. When the die cavity is to be opened, then hydraulic pressure fluid is supplied through line 33, and exhausted through line 32, to drive the piston 21a toward the left as viewed in Figs. 1 and 2, causing the links 26 and 27 to break inwardly, thus removing plates 16 and 17 from plate 15 and permitting the removal of a molded disk from the die cavity.

My improved nozzle 34 is mounted on the end of a heating chamber structure 35 with a passageway 36 through the nozzle construction communicating with the hollow 37 of the heating chamber in the usual manner. This heating chamber may be of any suitable form but is preferably constructed as taught in the copending application of Ernest P. Moslo and Arthur H. Radde, Serial No. 111,428, filed August 20, 1949 for Plastic Molding Machine, now Patent No. 2,778,062. The heating chamber is provided with a plurality of electrical heating units 38 and the nozzle is preferably surrounded by an electrical heating unit 39. Solid plastic in a finely divided form is fed from a main hopper 40 through a pusher chamber 41 to a transfer hopper 42 where it drops into a chamber 43 just ahead of the ram 44 which serves to carry the solid finely divided synthetic resin material into the hollow of the heating chamber 37 where it gradually becomes flowable as it moves toward the exit end of the chamber as is well known. The ram 44 is driven by a piston 45 which in turn is connected with a piston head 46 which is reciprocable in a chamber 47 of a cylinder 48 rigidly mounted on the member 49. Hydraulic pressure fluid is provided through conduits 50 and 51 to opposite ends of the cylinder 48 in the usual manner under suitable controls for reciprocating the piston and causing the ram 44 to force material through the heating chamber and out through the nozzle 34 in the usual manner.

My novel improvement consists in the novel cooperation between the nozzle 34 and the die cavity being so arranged that the flowable synthetic resin material moves quickly to all parts of the thin disk to be cast, while the tip end of the nozzle completely fills the hole which is intended to be formed in the thin disk such as a phonograph record. Then, when the nozzle is withdrawn after the synthetic resin material has set, the nozzle leaves the hole clean in its desired condition with no attached sprue whatsoever.

Referring now to Figs. 3, 4, and 5, the nozzle 34 is suitably mounted in communication with the heating chamber 35, as by means of the adapter 52 which is threaded into the heating chamber member 35 at one end and threadedly receives the nozzle at the outer end. The nozzle is provided with a small cylindrical nose 34a having an outside diameter of the exact size to form the desired hole 18 in the center of the molded disk. In a commonly used phonograph record at the present time the hole is of such a size that the diameter of the nose 34a is made 0.287 inch. The nozzle has a hollow central opening 34b which extends down into the nose 34a as clearly shown in Fig. 3 leaving a hollow tubular wall around the sides of the nozzle which, in one embodiment of my invention, is from 40 to 60 thousandths of an inch in thickness. The opening 20a in the wear plate 20 is adapted to snugly receive the extreme end of the nozzle nose 34a and for this purpose the recess 20a extends slightly beyond the plane of the die cavity as represented by the recess 16a. This holds the end of the nozzle firmly seated in the opening 20a when the nozzle is ready to inject a disk, with a slight clearance between the end of the nozzle and the bottom of the recess 20a. Passage means is provided between the hollow of the nozzle and the die cavity consisting of a plurality of very fine holes 34c. In a preferred form of my invention there are sixteen of these holes radially arranged as shown in Figs. 4 and 5 and each hole has a diameter of approximately 0.025 inch.

While my invention may be utilized with a molding machine as above described, I prefer to arrange all of the mechanism at the right-hand end of the machine toward the right so as to give clear access to the dies. To this end, the members 12 and 49 are provided with a pair of parallel projections 12a and 49a respectively which extend downwardly through long parallel slots 10a in the base member 10. The lower ends of the projections are provided with gibs 12b and 49b respectively which underly the member 10 and guide the pedestals 12 and 49 as they reciprocate back and forth. Tie bars 60 are provided at each side of the machine to rigidly fasten the members 12 and 49 together. The means provided for reciprocating the members 12 and 49 comprises a cylinder 61 fixed to the base 10 and having a reciprocating piston 61a whose piston rod 61b is attached in a suitable manner to the member 49. Conduits 62 and 63 provide means for providing the pressure fluid to opposite faces of piston 61a to reciprocate the same back and forth under control means not shown. When a molding operation is to be performed, cylinder 21 is first operated to clamp die blocks 16 and 15 together, then the projections 12a are run up against the left-hand end of the slots 10a as shown in Fig. 1 and Fig. 1A which will properly position the nozzle as indicated in Fig. 3. When a molding operation is finished, after the plastic has its initial set, piston 61a is driven toward the right from the position shown in Fig. 1 which removes the member 12 and the heating chamber 35 and nozzle 34 toward the right carrying the nose 34a of the nozzle away from the dies 15 and 16. This permits the heater 39 to reheat the nozzle to keep the nose 34a warm and to prevent the freezing of thermoplastic material in the small openings 34c. At the same time, it minimizes the heating of the die blocks 15 and 16 through contact with the hot nozzle 34 and maintains the die blocks at a better temperature for rapid molding.

When a thin disk is to be molded, the die cavity is closed utilizing the cylinder and piston mechanism at 21 and the parts are then in the position of Fig. 3. The ram 44 is then operated to force flowable synthetic resin material out through the passage means including the nozzle opening 34b and the fine openings 34c. This causes the plastic material to move rapidly in all directions from the center of the disk outwardly so that it is formed quickly and accurately without any opportunity of the resin material cooling before it has completely filled the die cavity. In a moment the synthetic resin material sets and then the member 12, chamber 35 and nozzle 34 are withdrawn toward the right using cylinder 61 as described. A few seconds later the disk is cured and then the plates 16 and 17 are withdrawn from the die cavity closing position shown in Fig. 3, utilizing the cylinder 21. The molded disk in the recesses 15a and 16a is then removed using standard knock-out pins if desired. Such knock-out mechanism is not shown here as it forms no part of the present invention. It is obvious that the resin material is sheared off around the cylindrical periphery of the nose 34a leaving no sprue whatsoever. The nozzle remains sufficiently hot from the resin material and because of the heater 39 that no resin material hardens in the opening 34b in the normal use of a modern injection molding machine.

If there is any tendency for the synthetic resin material to harden, it only occurs in the small holes 34c which are of very small diameter as previously mentioned and are of very slight extent radially as was mentioned in connection with the thickness of the tubular wall around the nozzle nose 34a. Thus, any resin material which should harden in the passageways 34c is forced out upon the next molding operation and these tiny bits of resin material, even if they have hardened slightly are acceptably accommodated into the next disk to be molded and there is no waste of material and no sprue to be cut off in order to finish a disk.

Certain phonograph records utilize a central hole which is approximate 1½ inches in diameter. For molding such records, I utilize the nozzle shown in Figs. 6 and 7. Here the metal insets 19' and 20' represent portions of the plates 15 and 16 having the same position and the analogous function to the portions 19 and 20 previously described. The mold cavity 15' is formed by suitable recesses in the front and rear cavity plates 15 and 16 in the usual manner and analogous to that previously described. The only difference is that the opening 200 in the insert 20' is of approximately 1½ inches in diameter to receive the nose 54 of the nozzle 34' snugly. This nozzle 34' has a thread 53 which fits directly into the heating chamber 35 previously described. A member 54 is threaded into the outer end of the nozzle so as to more easily form the desired passage means. This member 54 has a plurality of small radially extending passageways 55 which extend radially outwardly to connect the hollow 56 of the nose with an annular passageway 57 extending entirely around the nozzle near its periphery in a plane generally at right angles to the axis of the nozzle. In a preferred form of my invention, there are twelve of these holes 55 formed by a drill of 0.0935 inch diameter. The passageway 57 is formed by registering recesses in the member 54 and nozzle 34' as shown in Fig. 6, and provides an annular passageway of generally circular cross-section and of approximately 0.186 inch diameter. A shoulder 54a engaging between the member 54 and the nozzle 34' holds these parts slightly separated entirely around the periphery of the nozzle so as to form a gap 58 which in a preferred form of my invention is about 0.010 inch measured axially and only a few thousandths of an inch in extent radially.

The operation of the structure shown in Figs. 6 and 7 is analogous to that already described. The die cavity is closed bringing the parts to the position of Fig. 6. The ram 44 is then operated to force flowable synthetic resin material through the heating chamber cavity 37 and through the hollow 56 of the nozzle and then out through the passage means including the radial holes 55, the annular passageway 57 and the radially extending slit or gap 58 into the mold cavity 15'. The flowable plastic material thus is shot radially in all directions from the center outwardly in the mold cavity 15' and quickly fills the mold so as to make a very accurate record. As soon as the synthetic resin material has its initial set, relative withdrawal movement of nozzle 34 is provided using cylinder 61. Then when the disk is cured, cylinder 21 is utilized so as to open the mold cavity and remove the molded disk. Here again, the outside diameter of the nozzle 34' where it passes through the record is of the desired diameter of the hole formed in the record and the synthetic resin material is sheared off around the gap 58 as the nozzle is separated from the molded disk so that no sprue is left.

As in the previously described form of my invention, no material will freeze in the passageways 56, 55 and 57 in the normal operation of a modern injection molding machine in view of the fact that electrical heating means is provided at 59 to keep the nozzle hot, and the nozzle is quickly removed from the die blocks after an injection. If any resin material freezes, it will be only in the gap 58 which is approximately ten thousandths inches in axial direction and less than ten thousandths inches in the radial direction so that any material which might partially harden at this location is broken into a very large number of very small bits upon the next molding operation and acceptably incorporated in the next disk to be molded.

Figure 8:
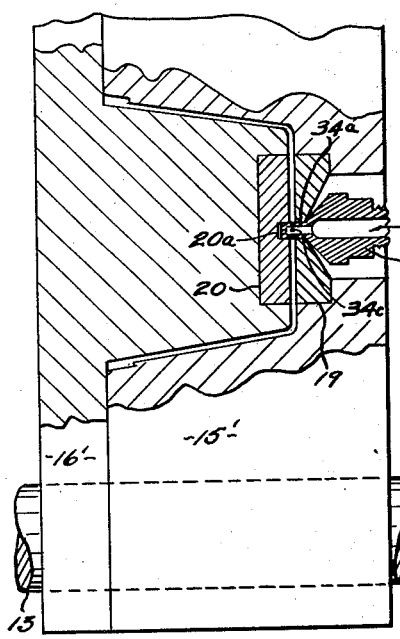
Fig. 8 is a fragmental sectional view showing a modification of the left-hand portion of Fig. 3 in order to mold a bowl or flower pot.

In the modification of Fig. 8, everything is supposed to be exactly the same as that described in connection with Fig. 3 except for the parts now about to be described. The only difference in Fig. 8 is that it is intended to mold a plastic flower pot having a hole in the bottom thereof as is customary rather than the thin phonograph disk of Fig. 3. To this end, the cavity plates 15' and 16' are provided with coacting surfaces which, when the die is closed as shown in Fig. 8, provide a cavity opening for molding the synthetic resin material in the form customary for a flower pot. The wear pieces 19 and 20 provide a recess 20a for closely and snugly receiving the end 34a of the nozzle 34. The only outlet for the flowable plastic material from the nozzle is by way of the very fine openings 34c which are the same as those described in connection with Fig. 3.

The operation of this form of my invention should now be apparent. With the parts in the position of Fig. 8, the plastic material is ejected through the openings 34b and 34a until the die cavity is filled with plastic material. Then, when the material has set, the nozzle 34 is withdrawn thus shearing off the plastic material opposite the openings 34c and leaving a clean hole in the bottom of the flower pot and automatically cutting off any sprue there might be at the openings 34c.

Figure 8A:
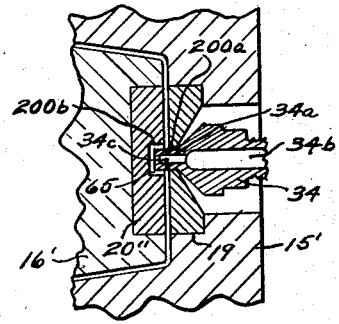
Fig. 8A is a fragmental sectional view of a portion of Fig. 8 showing a manner of molding the bowl of Fig. 8 so that it will not have a through hole in the bottom when the article is completed.

A further modification of Fig. 8 is shown in Fig. 8A where only the central portion of Fig. 8 is reproduced as this is the only change between the two figures. The central opening 200a in the wear piece 19 is exactly like that in Fig. 8 and snugly surrounds the nose 34a of the injection nozzle 34. The recess 200b located centrally of the wear piece 20' is of slightly greater diameter than the nose 34a of the nozzle and the opening 200b is sufficiently deep so that the nozzle end 34a does not bottom in the recess 200b when the die is in closed and injecting position as shown in Fig. 8A. In other words, the die cavity provides space to provide a complete cap 65 around the end of the nozzle portion 34a so that when the complete article is molded, there will be no hole in the bottom thereof. After the article is molded and set with the parts in the position of Fig. 8A, then as the nozzle 34 is withdrawn toward the right, any plastic material in the openings 34c is sheared off as the nozzle is withdrawn and no sprue is left.

Figure 9:
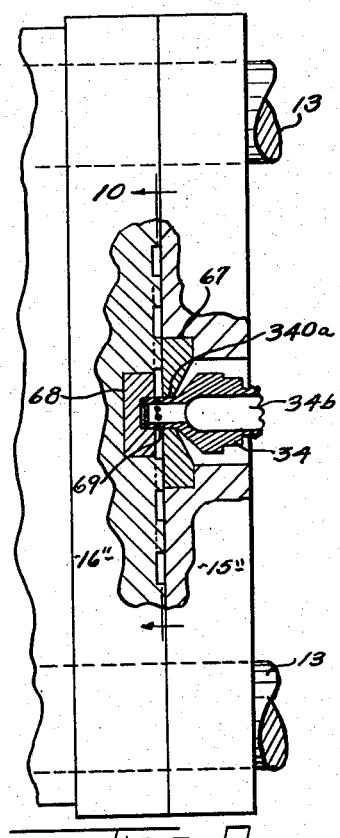
Figure 10:
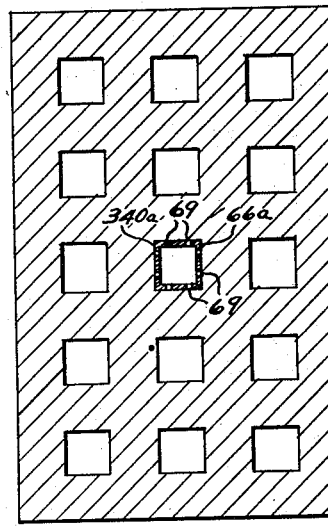
Fig. 10 is a transverse sectional view, enlarged, taken along the line 10—10 of Fig. 9.

The modification shown in Figs. 9 and 10 is for the purpose of molding an open-work grille 66 as clearly seen in Fig. 10. This grille may have any desired shape as long as it has a central opening 66a, to receive the nozzle of the injection molding machine. As shown in Figs. 9 and 10, all of the parts are intended to be exactly the same as that shown in Fig. 3 except as hereinafter explained. The nozzle 34 is the same as previously described and has a central passageway 34b for the passage of the heated plastic material. The nozzle 340a is square as clearly seen in Fig. 10 and snugly fits a square opening in the wear piece 67. The end of the nozzle also snugly fits in a square opening in the wear piece 68. A plurality of very fine openings 69 are provided around the periphery of the nozzle portion 340a and in communication with the surrounding cavity for forming the grille work 66 as formed by the closed front and rear cavity plates 15″ and 16″, which are shown in closed position in Fig. 9. It should now be obvious that the device of Figs. 9 and 10 will operate similar to those previously described. The flowable plastic material goes through the passages 34b and 340a into the mold cavity to form the device 66. Then when the synthetic resin material has set, the nozzle 34 is withdrawn toward the right as shown in Fig. 9 which will shear off any material in the openings 69 thus leaving a clean molded article 66 without any sprue.

What I claim is:

1. Apparatus for injection molding articles of synthetic resin material having a central cylindrical opening, comprising a die having walls enclosing a cavity having the form of the article to be molded, there being openings in said walls registering with the opening to be molded in said article, an injection nozzle adapted to enter said openings in said walls, the outer wall of said nozzle being a snug fit in said wall openings, said nozzle having a hollow center surrounded by a cylindrical wall not substantially over 0.060 inch thick and having a plurality of holes not substantially greater than 0.050 inch in diameter extending generally radially through said cylindrical wall and communicating with said cavity when said nozzle fits in said wall openings, means for injecting flowable synthetic resin material through said nozzle and holes into said cavity, and means for causing withdrawal movement between said nozzle and said die after an article is molded to clear said nozzle from said openings, whereby said nozzle as it is withdrawn from said openings shears said resin material around the periphery of said nozzle leaving no sprue, said hole size being sufficiently small in volume that the resin material left therein is incorporated acceptably in the next article molded in a series.

2. Apparatus for injection molding articles of synthetic resin material having a central cylindrical opening, comprising a die having walls enclosing a cavity having the form of the article to be molded, there being openings in said walls registering with the opening to be molded in said article, an injection nozzle adapted to enter said openings in said walls, the outer wall of said nozzle being a snug fit in said wall openings, said nozzle having a hollow center surrounded by a cylindrical wall having passage means therethrough and communicating with said cavity when said nozzle fits in said openings, said passage means comprising a plurality of holes extending generally radially through said wall and with an annular passageway in said wall radially outside of and communicting with said radial holes and with an annular slit extending substantially radially from said annular passageway outwardly to the outer face of said cylindrical wall, means for injecting flowable synthetic resin material through said nozzle and passage means into said cavity, and means for causing withdrawal movement between said nozzle and said die after an article is molded to clear said nozzle from said openings, whereby said nozzle as it is withdrawn from said openings shears said resin material around the periphery of said nozzle leaving no sprue.

3. The combination of claim 2 wherein said annular slit is not substantially over 0.020 inch wide and not substantially over 0.015 inch in radial extent.

References Cited in the file of this patent

UNITED STATES PATENTS

| 2,358,857 | Gits | Sept. 26, 1944 |

FOREIGN PATENTS

| 731,150 | Great Britain | June 1, 1955 |